US008554009B2

(12) United States Patent
Zong et al.

(10) Patent No.: US 8,554,009 B2
(45) Date of Patent: Oct. 8, 2013

(54) SIMPLE MATRIX METHOD FOR STRAY-LIGHT CORRECTION IN IMAGING INSTRUMENTS

(75) Inventors: Yuqin Zong, Gaithersburg, MD (US); Steven W. Brown, Washington Grove, MD (US); Keith R. Lykke, Gaithersburg, MD (US); Yoshihiro Ohno, North Potomac, MD (US)

(73) Assignee: The United States of America as represented by the Secretary of Commerce (NIST), Washington, DC (US)

( * ) Notice: Subject to any disclaimer, the term of this patent is extended or adjusted under 35 U.S.C. 154(b) by 1200 days.

(21) Appl. No.: 12/228,495

(22) Filed: Aug. 13, 2008

(65) Prior Publication Data

US 2009/0059210 A1 Mar. 5, 2009

Related U.S. Application Data

(60) Provisional application No. 60/955,975, filed on Aug. 15, 2007.

(51) Int. Cl.
*G06K 9/40* (2006.01)
(52) U.S. Cl.
USPC .............................. 382/274; 356/124; 382/254
(58) Field of Classification Search
USPC .................................................. 382/274, 275
See application file for complete search history.

(56) References Cited

U.S. PATENT DOCUMENTS

| 5,818,977 | A | 10/1998 | Tansley |
| 6,975,775 | B2 | 12/2005 | Rykowski et al. |
| 2005/0117114 | A1* | 6/2005 | Jiang .............................. 351/177 |
| 2010/0135594 | A1* | 6/2010 | Allebach et al. .............. 382/275 |
| 2010/0266178 | A1* | 10/2010 | Liang et al. ................... 382/131 |

OTHER PUBLICATIONS

Y.Zong, S.W. Brown, B.C. Johnson, K.R.Lykke and Y.Ohno "Simple Spectral Stray Light COrrection Method for Array Spectroradiometeres" Applied Optics, vol. 45, No. 6, pp. 1111-1119 (2006).*
Y. Zong, S.W. Brown, B.C. Johnson, K.R. Lykke and Y. Ohno, "Simple Spectral Stray Light Correction Method for Array Spectroradiometers," Applied Optics, vol. 45, No. 6, pp. 1111-1119 (2006).

(Continued)

*Primary Examiner* — Gregory J Toatley
*Assistant Examiner* — Rebecca C Bryant
(74) *Attorney, Agent, or Firm* — Daphne L. Burton; Burton IP Law Group

(57) ABSTRACT

A simple matrix method and computer program product for stray-light correction in imaging instruments is provided. The stray-light correction method includes receiving raw signals from an imaging instrument and characterizing the imaging instrument for a set of point spread functions. For high resolution imaging instruments, the raw signals may be compressed to reduce the size of the correction matrix. Based on stray-light distribution functions derived from the point spread functions, a correction matrix is derived. This fast correction is performed by a matrix multiplication to the measured raw signals, and may reduce stray-light errors by more than one order of magnitude. Using the stray-light corrected instrument, significant reductions may be made in overall measurement uncertainties in radiometry, colorimetry, photometry and other applications. Because the PSFs may include other types of undesired responses, the stray-light correction also eliminates other types of errors, e.g., interreflection between a CCD and the detector window.

24 Claims, 8 Drawing Sheets

(56) References Cited

OTHER PUBLICATIONS

Y. Zong, S.W. Brown, G. Meister, R.A. Barnes and K. Lykke, "Characterization and Correction of Stray Light in Optical Instruments," Proc. of SPIE vol. 6744, 67441L, Sensors, Systems, and Next-Generation Satellites XI (2007).

Y. Zong, S.W. Brown, C. C. Miller, and Y. Ohno, "A Simple Method for Stray Light Correction in Optical Systems," presented at SPIE Optics & Photonics, Aug. 13-17, 2006, San Diego, California USA.

Y. Zong, S.W. Brown, B.C. Johnson, K.R. Lykke and Y. Ohno, "Correction of Stray Light in Spectrographs: Implications for Remote Sensing," Proc. of SPIE, vol. 5882 Earth Observing Systems X (2005), pp. 588201-1 to 588201-8.

S.W. Brown, B.C. Johnson, M. E. Feinholz, M.A. Yarbrough, S.J. Flora, K.R. Lykke and D.K. Clark, "Stray Light Correction Algorithm for Spectrographs," Metrologia, 40, S81-83, Feb. 7, 2003.

Y. Zong, "Simple Matrix Method for Stray-Light Correction in Optical Systems," presented at Optical Technology Division Seminar, NIST, Dec. 13, 2006.

Y. Zong, S.W. Brown, K.R. Lykke and Y. Ohno, "Correction of Stray Light in Spectroradiometers and Imaging Instruments," Proc. 26th of the CIE, Beijing, 2007.

P.A. Boynton and E.F. Kelley, "Accurate Contrast-Ratio Measurements Using a Cone Mask," SID Symposium, Digest of Technical Papers, 1997, Sec 32.1, 823-826.

H.Y. Yoon, D.W. Allen, R.D. Saunders, "Methods to Reduce the Size-of-Source Effect in Radiometers," Metrologia, 2005, 42, 89-96.

Y. Zong, S.W. Brown, Y. Ohno, "Simple Matrix Method for Correction of Spatial Stray-Light Errors in Imaging Instruments," Abstract for CORM 2007 Annual Conference, Gaithersburg, MD, May 8-11, 2007.

Y. Zong, "Spatial Stray Light Correction for Imaging Instruments Using Matrix Method," presented at CORM 2007 Annual Conference, Gaithersburg, MD, May 8-11, 2007.

Y. Zong, S.W Brown, B.C. Johnson, K.R. Lykke and Y. Ohno, "Simple Spectral Stray Light Correction Method for Array Spectroradiometers," Applied Optics, vol. 45, No. 6, pp. 1111-1119 (2006).

"Methods of Characterizing Illuminance Meters and Luminance Meters," CIE Publication No. 69, 1987, 16-17.

Adam S. Bolton and David J. Schlegel, Spectro-Perfectionism: An Algorithmic Framework for Photon Noise-Limited Extraction of Optical Fiber Spectroscopy, Pub. Astron. Soc. Pacific, vol. 122, No. 888. (Feb. 1, 2010), pp. 248-257.

Peter A. Jansson & Robert P. Breault, Correcting Color-Measurement Error Caused by Stray Light in Image Scanners, the Sixth Color Imaging Conference, Color Science,Systems and Applications, Jan. 1, 1998, pp. 69-73.

* cited by examiner

PSF, $s_{k,l}$, at Pixel (3,3)
| $s_{1,1}$ | $s_{1,2}$ | $s_{1,3}$ | $s_{1,4}$ | $s_{1,5}$ |
| $s_{2,1}$ | $s_{2,2}$ | $s_{2,3}$ | $s_{2,4}$ | $s_{2,5}$ |
| $s_{3,1}$ | $s_{3,2}$ | $s_{3,3}$ | $s_{3,4}$ | $s_{3,5}$ |
| $s_{4,1}$ | $s_{4,2}$ | $s_{4,3}$ | $s_{4,4}$ | $s_{4,5}$ |
| $s_{5,1}$ | $s_{5,2}$ | $s_{5,3}$ | $s_{5,4}$ | $s_{5,5}$ |
$$d_{k,l} = \frac{s_{k,l}}{\sum_{k,l \in IR(3,3)} s_{k,l}}$$
SDF, $d_{k,l}$, at Pixel (3,3)
| $d_{1,1}$ | $d_{1,2}$ | $d_{1,3}$ | $d_{1,4}$ | $d_{1,5}$ |
| $d_{2,1}$ | $d_{2,2}$ | $d_{2,3}$ | $d_{2,4}$ | $d_{2,5}$ |
| $d_{3,1}$ | $d_{3,2}$ | $d_{3,3}$ | $d_{3,4}$ | $d_{3,5}$ |
| $d_{4,1}$ | $d_{4,2}$ | $d_{4,3}$ | $d_{4,4}$ | $d_{4,5}$ |
| $d_{5,1}$ | $d_{5,2}$ | $d_{5,3}$ | $d_{5,4}$ | $d_{5,5}$ |
2D PSF, $s_{k,l}$
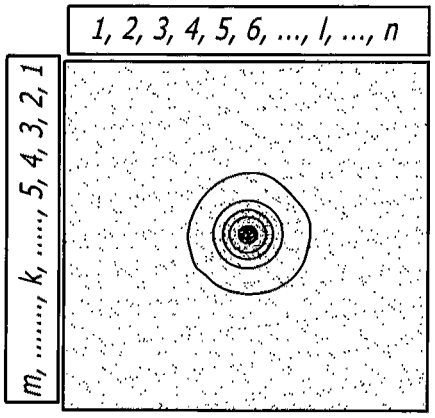
$$d_{k,l} = \frac{s_{k,l}}{\sum_{k,l \in IR} s_{k,l}}$$
2D SDF, $d_{k,l}$
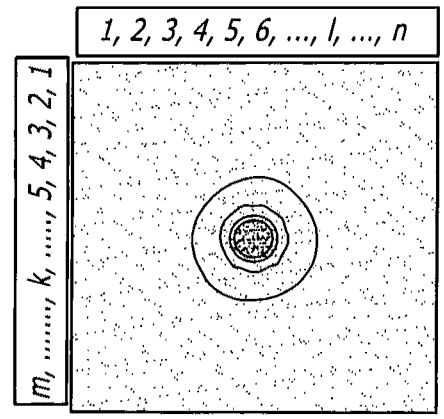
FIG. 4

$$D_{25 \times 25} = \begin{bmatrix} \cdots & d_{1,13} & \cdots \\ \cdots & d_{2,13} & \cdots \\ \cdots & d_{3,13} & \cdots \\ \cdots & d_{4,13} & \cdots \\ \cdots & d_{5,13} & \cdots \\ \cdots & d_{6,13} & \cdots \\ \cdots & d_{7,13} & \cdots \\ \cdots & d_{8,13} & \cdots \\ \cdots & d_{9,13} & \cdots \\ \cdots & d_{10,13} & \cdots \\ \cdots & d_{11,13} & \cdots \\ \cdots & d_{12,13} & \cdots \\ \cdots & d_{13,13} & \cdots \\ \cdots & d_{14,13} & \cdots \\ \cdots & d_{15,13} & \cdots \\ \cdots & d_{16,13} & \cdots \\ \cdots & d_{17,13} & \cdots \\ \cdots & d_{18,13} & \cdots \\ \cdots & d_{19,13} & \cdots \\ \cdots & d_{20,13} & \cdots \\ \cdots & d_{21,13} & \cdots \\ \cdots & d_{22,13} & \cdots \\ \cdots & d_{23,13} & \cdots \\ \cdots & d_{24,13} & \cdots \\ \cdots & d_{25,13} & \cdots \end{bmatrix}$$

with columns $J=1$, $J=13$, $J=25$.

FIG. 6

SIMPLE MATRIX METHOD FOR STRAY-LIGHT CORRECTION IN IMAGING INSTRUMENTS

CROSS-REFERENCE TO RELATED APPLICATIONS

The present application claims priority to provisional application Ser. No. 60/955,975, filed on or about Aug. 15, 2007, entitled "Simple Matrix Method for Stray-Light Correction in Imaging Instruments," naming the same inventors as in the present application. The contents of this provisional application are incorporated by reference, the same as if fully set forth.

STATEMENT REGARDING FEDERALLY SPONSORED RESEARCH/DEVELOPMENT

N/A.

BACKGROUND OF THE INVENTION

1. Field of Invention

The present disclosure relates to stray-light correction in imaging instruments and, more particularly, to stray-light correction using a stray-light correction matrix derived from point spread functions (PSFs) characterized from imaging instruments.

2. Description of Related Art

Radiometric/photometric data may be acquired using imaging instruments, such as digital cameras, hyperspectral imaging systems, imaging radiometers, imaging photometers and other types of imaging instruments or optical systems. Image quality, including image sharpness, contrast, and stray light, is often an important characteristic of such imaging instruments or optical systems.

The quality of images for such imaging instruments can be improved through state of the art hardware designs and advanced manufacturing processes. This hardware approach, however, may be limited by physics and available technologies. For example, detector window reflections, minimum achievable surface reflections and/or scattering from lenses, mirrors, and other types of optical components. This hardware approach may also be limited by the manufacturing cost of imaging instruments.

Stray light in an imaging instrument may be the dominant source of measurement errors. For example, for a photometer/radiometer, stray light may be the dominant source of measurement error involving the contrast ratio of flat panel displays. Stray-light errors in an imaging instrument are often known as "veiling glare" in photometry and "size-of-source effect" in radiometry.

There is a need for an image improvement technique that can significantly reduce measurement errors, while taking into account errors due to stray light.

Various mathematical theories and algorithms have been devised and implemented in order to improve the quality of images for imaging instruments or optical systems. These previously developed techniques are generally based on the deconvolution algorithms to improve image sharpness, while failing to focus on stray light errors. These techniques incorporate the use of complex mathematical theories. When a computer is required to perform complex mathematics, the computer's processor may be heavily burdened, thus resulting in slow response time. Thus, using these techniques involving complex mathematical theories, it may it may not be possible to perform fast corrections of stray-light errors.

Moreover, such techniques may require a significant amount of processing power. Again, this technique does not focus on measurement errors due to stray light.

Accordingly, there is further a need for an image improvement technique that does not require complicated mathematical theories, and which can perform robust, fast correction of stray-light errors.

BRIEF SUMMARY OF DISCLOSURE

The present disclosure addresses the foregoing deficiencies of the prior art by providing stray-light correction using a simple matrix derived from point spread functions (PSFs) characterized by imaging instruments.

In accordance with one embodiment of the present disclosure, a simple matrix method for stray-light correction in an imaging instrument is provided. The method comprises the steps of determining a set of point spread functions for the imaging instrument, deriving a stray-light distribution function for each of said point spread functions. The method further comprises obtaining a stray-light distribution matrix based on the derived stray-light distribution functions, and deriving a stray-light correction matrix, including inverting the stray-light distribution matrix and an identity matrix.

In accordance with another embodiment of the present disclosure, a computer program product is provided for a simple matrix method for stray-light correction. The computer program product comprises a computer useable medium having computer readable code embodied therein. The computer program product includes point spread function code for causing the computer to determine a set of point spread functions for the imaging instrument, stray-light distribution function code for causing the computer to derive a stray-light distribution function for each of said point spread functions, stray-light distribution matrix code for causing the computer to obtain a stray-light distribution matrix based on the derived stray-light distribution functions, and stray-light correction matrix code for causing the computer to derive a stray-light correction matrix, including code for causing the computer to invert the stray-light distribution matrix and an identity matrix.

In accordance with yet another embodiment of the present disclosure, a simple matrix method is provided for stray-light correction in an imaging instrument. This method may be particularly useful for high resolution imaging instruments having a large number of imaging elements. This simple matrix method comprises the steps of receiving, from the imaging instrument, measured raw signals of a light source, binning the measured raw signals to reduce the number of measured raw signals. The method further includes determining a set of point spread functions for the imaging instrument based on the binned raw signals.

This simple matrix method further includes deriving a stray-light distribution function for each of said point spread functions. Based on the derived stray-light distribution functions, the method includes obtaining a stray-light distribution matrix, and deriving a stray-light correction matrix, including inverting the stray-light distribution matrix and an identity matrix.

In accordance with still another embodiment of the present disclosure, another simple matrix method is provided for stray-light correction in an imaging instrument. This method may also be particularly useful for high resolution imaging instruments. This method comprises the steps of receiving, from the imaging instrument, measured raw signals of a light source. Based on the raw signals, the method includes determining a set of point spread functions for the imaging instrument. The method still further includes deriving a stray-light distribution function for each of said point spread functions. Based on the derived stray-light distribution functions, the method includes obtaining a stray-light distribution matrix and deriving a stray-light correction matrix, including inverting the stray-light distribution matrix and an identity matrix, wherein the stray-light correction matrix includes a number of elements. The method also includes applying a binning technique to reduce the number of elements in the correction matrix.

These, as well as other objects, features and benefits will now become clear from a review of the following detailed description of illustrative embodiments and the accompanying drawings.

BRIEF DESCRIPTION OF DRAWINGS

FIG. 4 illustrates the relationship between a two-dimensional point spread function and a corresponding two-dimensional stray-light distribution function in accordance with one embodiment of the present disclosure.

FIG. 6 illustrates a 25×25 stray-light distribution function matrix in accordance with one embodiment of the present disclosure.

DETAILED DESCRIPTION OF THE DISCLOSURE

The stray-light correction method of the present disclosure provides for stray-light correction in imaging instruments. Initially, an imaging instrument may be characterized for a set of point spread functions (PSFs) covering the instrument's field of view. Subsequently, each PSF may be used to derive stray-light distribution functions (SDFs). Using this set of derived SDFs and using interpolation/extrapolation between the SDFs, all SDFs may be obtained. Then, each two-dimensional SDF may be transformed to a one-dimensional column vector. Using all column vector SDFs, an SDF matrix may be constructed. Finally, the SDF matrix and identity matrix may be used to derive the stray-light correction matrix by a matrix inversion of both the SDF matrix and identity matrix. This rapid correction technique can be used for correction of stray-light errors in measured images by a simple matrix multiplication.

Imaging instruments to which the stray-light correction technique may be applied include air-borne/space-borne remote sensing imagers, photometers, radiometers, digital cameras, sensors, electron microscopy, medical imaging and other optical systems. Optical data that may be measured by these imaging instruments and optical systems includes radiance, luminance, and other optical quantities.

Figure 1:
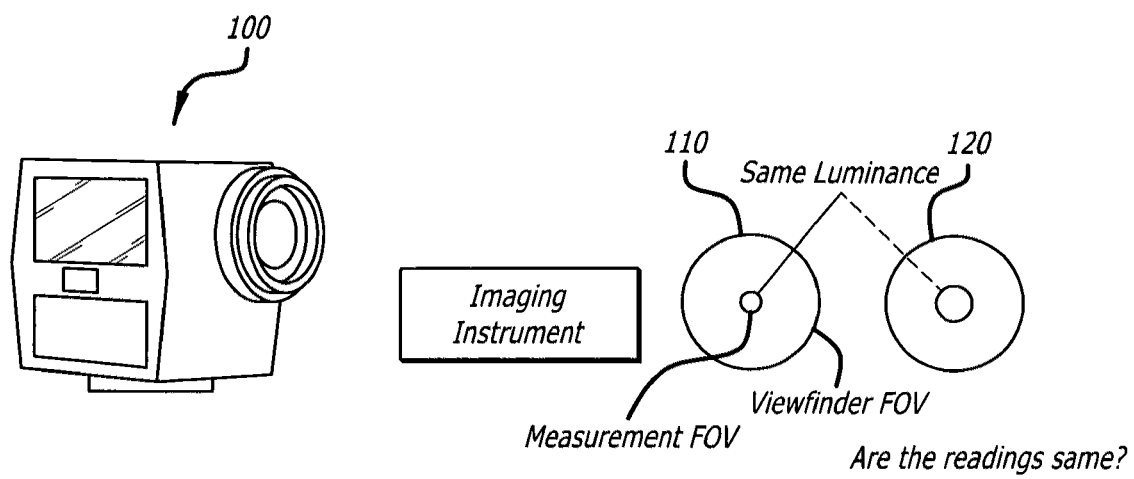
FIG. 1 illustrates a camera having stray-light errors in radiance/luminance measurements that can be addressed using the stray-light correction technique of the present disclosure.

Referring now to FIG. 1, illustrated is a camera exhibiting stray-light errors in luminance measurements that can be addressed using the stray-light correction technique of the present disclosure. FIG. 1 includes camera 100 and two circular light sources 110, 120 having the same luminance. The area of distribution of the first light source 110 extends beyond the camera viewfinder's field-of-view (FOV) and is much larger than the area of distribution of the second light source 120 that is only slightly larger than the camera's measurement FOV.

Even though the area of light distribution for each light source may be different, the camera 100 should obtain the same reading. This diagram illustrates the problems associated with stray light in that the camera's luminance measurements of the light sources are different. The light source 110 having the larger area of light distribution will generally have a higher luminance measurement result than the light source 120 having the smaller area of light distribution. Measurement errors due to stray light may be caused by, among other things, light scattering inside the camera 100, thus giving rise to different apparent luminance. These inconsistent luminance measurement results may also be due to stray light caused by light diffraction, or other phenomena that cause the image to be blurred, distorted and/or reduce the apparent contrast of an image. Whatever the cause may be, imaging instruments may exhibit such measurement errors due to stray light.

It should be noted that radiance and luminance are defined herein in accordance with their International Organization for Standardization (ISO) definitions. The definition for "radiance" may be found at ISO 31-6: 1992 (E), which reads as follows: "at any point on a surface and in a given direction, the radiant intensity of an element of the surface, divided by the area of the orthogonal projection of this element on a plane perpendicular to the direction." Further, in accordance with the ISO definition of luminance found at ISO 31-6: 1992 (E), "luminance" is defined herein as "at a point on a surface and at a given direction, the luminous intensity of an element of the surface, divided by the area of the orthogonal projection of this element on a plane perpendicular to the given direction."

Figure 2:
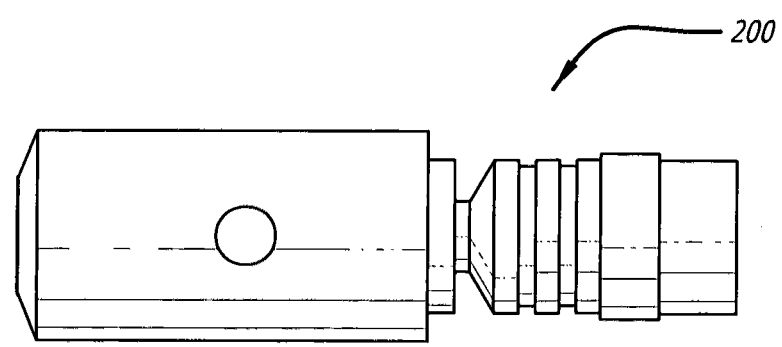
FIG. 2 illustrates a CCD-array imaging radiometer/photometer to which the simple matrix method technique may be applied in accordance with one embodiment of the present disclosure.

Referring now to FIG. 2, illustrated is a CCD-array imaging radiometer/photometer 200 to which the stray-light correction technique may be applied in accordance with one embodiment of the present disclosure. The instrument 200 has a two-dimensional charge coupled device (CCD) array of 1392×1040 pixels, a CCD pixel size of 4.65 micrometers ($\mu$m) by 4.65 $\mu$m. This instrument 200 further includes a 55 millimeter (mm) lens.

The source of stray light in imaging instruments may be source elements from an extended source known as spatial stray light. The term "spatial stray light" may be used to refer to stray light that is spatially distributed in an imaging instrument in two dimensions. Such stray light may be quantified in accordance with an imaging instrument's two-dimensional point spread functions (PSFs).

For stray-light correction using the simple matrix method technique, the imaging instrument or optical system may first be characterized for a set of point spread functions (PSFs) covering the imaging instrument's field of view (FOV). A PSF may be defined as a two-dimensional relative response of an imaging instrument when the imaging instrument is used to measure a point source or a small pin-hole source. For purposes of the present disclosure, a light source may be considered a point source if the resolution of the imaging instrument is too low to resolve its size. However, it should be understood that an instrument's PSFs could be obtained using approaches (e.g., deriving from line spread functions) other than direct measurement of a pin-hole or point source.

Photometer 200 may be characterized for a set of PSFs. PSF test conditions for the photometer 200 were for a pin-hole size of 0.2 mm in diameter at a distance of 2 meters (m) from the photometer. The iris of the lens for photometer 200 was at F2.8.

Figure 3:
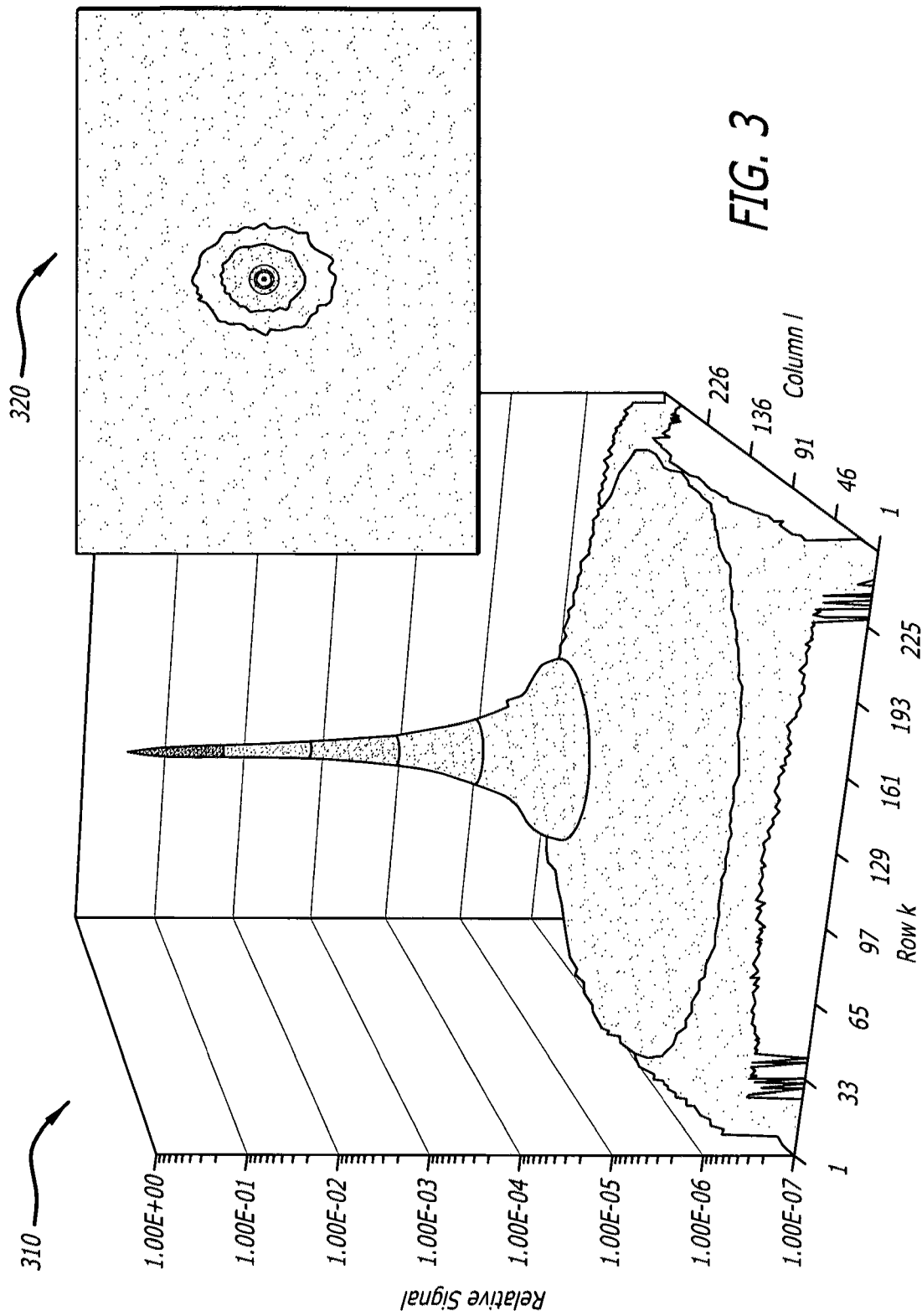
FIG. 3 illustrates a graph that shows a point spread function for a measured pin-hole or point source in accordance with one embodiment of the present disclosure.

Referring now to FIG. 3, illustrated is a three-dimensional graph 310 that shows a PSF for a measured pin-hole source in accordance with one embodiment of the present disclosure. This PSF graph 310 shows the two-dimensional relative response of the photometer when the photometer was used to measure the pin-hole light source. Although the measured pin-hole light source was quite small, i.e., 0.2 mm in diameter, this pin-hole sized image appeared much larger, blurred and/or scattered when measured by the photometer as illustrated by pin-hole source measurement. The degree to which the image is distorted, blurred and/or scattered may be used as a measure of the quality of the photometer 200 and other imaging instruments. Image 320 shows the point spread function in two-dimensions.

The PSF graph 310 shows a small range of the PSF that is populated near the peak of the measured raw signals. At this peak, the measured raw signals have been normalized to one. The higher the resolving power of the imaging instrument, the narrower the peak will be.

The number of PSFs to be determined in accordance with the simple matrix method is dependent upon a number of factors. For example, consistency between the PSFs for a particular imaging instrument may be a factor in determining the number of PSFs needed. Where the PSFs for a particular imaging instrument are consistent, fewer PSFs may be justified. On the other hand, where the PSFs for a particular imaging instrument are inconsistent, additional PSFs may be justified.

In addition, the number of PSFs may also depend upon the degree of correction accuracy needed for the imaging instrument. For an imaging instrument that requires a greater degree of correction accuracy in its applications, more PSFs may be called for when compared to a case where an instrument calls for a lesser degree of correction accuracy. In some cases, sixteen (16) or thirty-two (32) PSFs may be sufficient.

The PSFs, denoted $s_{k,l}$, that have been characterized for the photometer may be used to derive a stray-light distribution function (SDF). The SDF, denoted $d_{k,l}$, is the ratio of the stray-light signal to the total signal within the resolving power (IR) of the imaging instrument when the imaging instrument is used to measure a point source or a small pin-hole source. The SDF may be expressed as follows:

$$d_{k,l} = \frac{s_{k,l}}{\sum_{k,l \in IR} s_{k,l}}$$ (Equation 1)

Referring now to FIG. 4, illustrated is pictorial showing the relationship between the two-dimensional PSF and the two-dimensional SDF in accordance with one embodiment of the present disclosure. Here, the PSF and SDF are shown at pixel (3, 3), i.e., at row 3 and column 3. Each pixel sees only a small part of the image. As illustrated in FIG. 4, the above-referenced equation is used to determine the SDF, i.e., the ratio of the stray-light signal at a particular pixel to the total signal within the resolving power of the imaging instrument.

Actual SDFs may be derived from the actual PSFs. In addition thereto, interpolation and/or extrapolation may be performed to obtain additional SDFs between the actual SDFs. Any appropriate type of interpolation or extrapolation method may be used to construct new SDF data within the range of the set of known SDFs. For example, this two-dimensional interpolation may include nearest, linear, logarithmic, spline or polynomial, among others. Moreover, extrapolation may be used to determine additional SDFs outside the range of known SDFs. Thus, in addition to known SDFs, additional SDFs may be obtained using interpolation or extrapolation. These and other interpolation/extrapolation techniques are known in the arts.

At the lower portion of FIG. 4, illustrated is a general case two-dimensional PSF for a pin-hole source being converted to the corresponding SDF. As illustrated, k represents a row number, l represents a column number, m represents the total number of rows, and n represents the total number of columns of the detector array.

Each of the two-dimensional SDFs for each pixel—whether derived, interpolated or extrapolated—may be transformed to a one-dimensional column vector. In order to derive the one-dimensional column vector, the pixel index i may be expressed as follows:

$$i = (k-1) \times n + l$$ (Equation 2)

where m×n represents the total number of pixels of the detector array.

Figure 5:
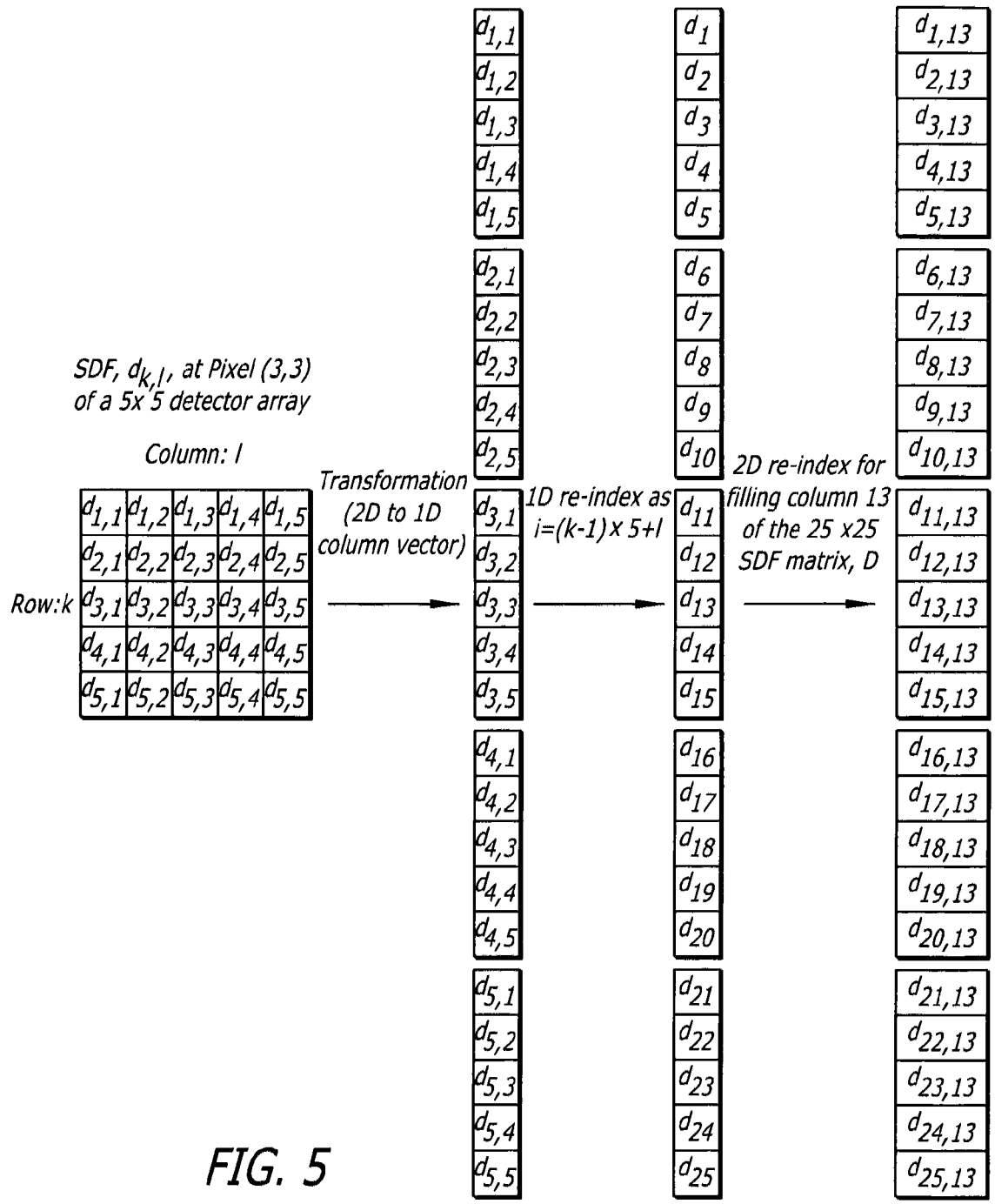
FIG. 5 illustrates how two-dimensional stray-light distribution functions may be transformed to a one-dimensional column vector in accordance with one embodiment of the present disclosure.

Referring now to FIG. 5, illustrated is an SDF pictorial showing how two-dimensional SDFs may be transformed to a one-dimensional column vector in accordance with one embodiment of the present disclosure. Here, SDFs are shown for a 5 by 5 matrix. The imaging instrument had a 5 by 5 pixel arrangement. Each row of the SDF is designated as k, and each column designated as l. The two-dimensional SDF at pixel (3, 3) is transformed to a one-dimensional column vector SDF. The one-dimensional column vector is then re-indexed as elements one to twenty-five. The pixel (3, 3) in the two-dimensional SDF becomes pixel 13 in the one-dimensional column vector SDF. This one-dimensional column vector SDF for pixel 13 is then used to fill the corresponding column 13 of the 25×25 SDF matrix, D. Here, in FIG. 5, the two-dimensional re-index column vector SDF for filling column 13 of the 25×25 SDF matrix, D, is also shown.

Using all the column vector SDFs for every pixel, an SDF matrix, D, may be constructed. Referring now to FIG. 6, illustrated is a simplified representative SDF matrix for all columns in accordance with one embodiment of the present disclosure. FIG. 6 highlights the placement of column 13 within the SDF matrix, D.

Similar to the SDF function's transformation from two-dimensions to a one-dimensional column vector, the measured raw image (or the stray-light distribution) may be transformed to a one-dimensional column vector for stray-light correction. The column vector image (or stray light) is denoted herein with a subscript "cv". For a wide scene measurement, the column vector of stray-light signals, $Y_{s\_spat,cv}$, may be expressed as a function of the SDF matrix, D, and the column vector of signals resulting from the light of the imaged scene within the resolving power of the imaging instrument, $Y_{IR,cv}$, as follows:

$$Y_{s\_spat,cv} \approx D Y_{IR,cv}$$ (Equation 3)

Because the measured raw signals are known, the column vector of the measured raw signals may be expressed as $Y_{meas, cv}$. Because it is known that the raw signals include the actual signal as well as the stray-light signals, their relationship may be expressed according to the following equation:

$$Y_{meas,cv} = Y_{IR,cv} + Y_{s\_spat,cv} \quad \text{(Equation 4)}$$

Substituting the known equivalents $DY_{IR, cv}$ for $Y_{s\_spat, cv}$, the following may be derived:

$$Y_{meas,cv} = Y_{IR,cv} + DY_{IR,cv} = [I+D]Y_{IR,cv} = AY_{IR,cv} \quad \text{(Equation 5)}$$

where $A=[I+D]$ is the square coefficient matrix of order m×n, and is nearly an identity matrix. Thus, $Y_{IR, cv}$ may be expressed in terms of $Y_{meas, cv}$ by a matrix inversion as follows:

$$Y_{IR,cv} = A^{-1}Y_{meas,cv} = C_{spat}Y_{meas,cv} \quad \text{(Equation 6)}$$

where $A=[I+D]$ is the stray-light correction matrix, denoted, $C_{spat}$. The instrument's response to stray light is corrected using the following equation:

$$Y_{IR,cv} = C_{spat}Y_{meas,cv} \quad \text{(Equation 7)}$$

where $Y_{IR, cv}$ is the column vector of the stray-light corrected signals and $Y_{meas, cv}$ is the column vector of the measured raw signals obtained by transforming the two-dimensional imaging signals. Using the equation immediately above, the stray-light correction becomes a simple matrix multiplication. It should be noted that the inversion of A (or [I+D]) is needed only once to obtain the correction matrix $C_{spat}$ as long as the instrument's imaging characteristics do not change. Also, the resulting stray-light correction may correct other unwanted responses, e.g., the interreflection between the detector array and the detector window, as well since the measured PSFs also include other types of undesired responses from the imaging instrument.

Figure 7:
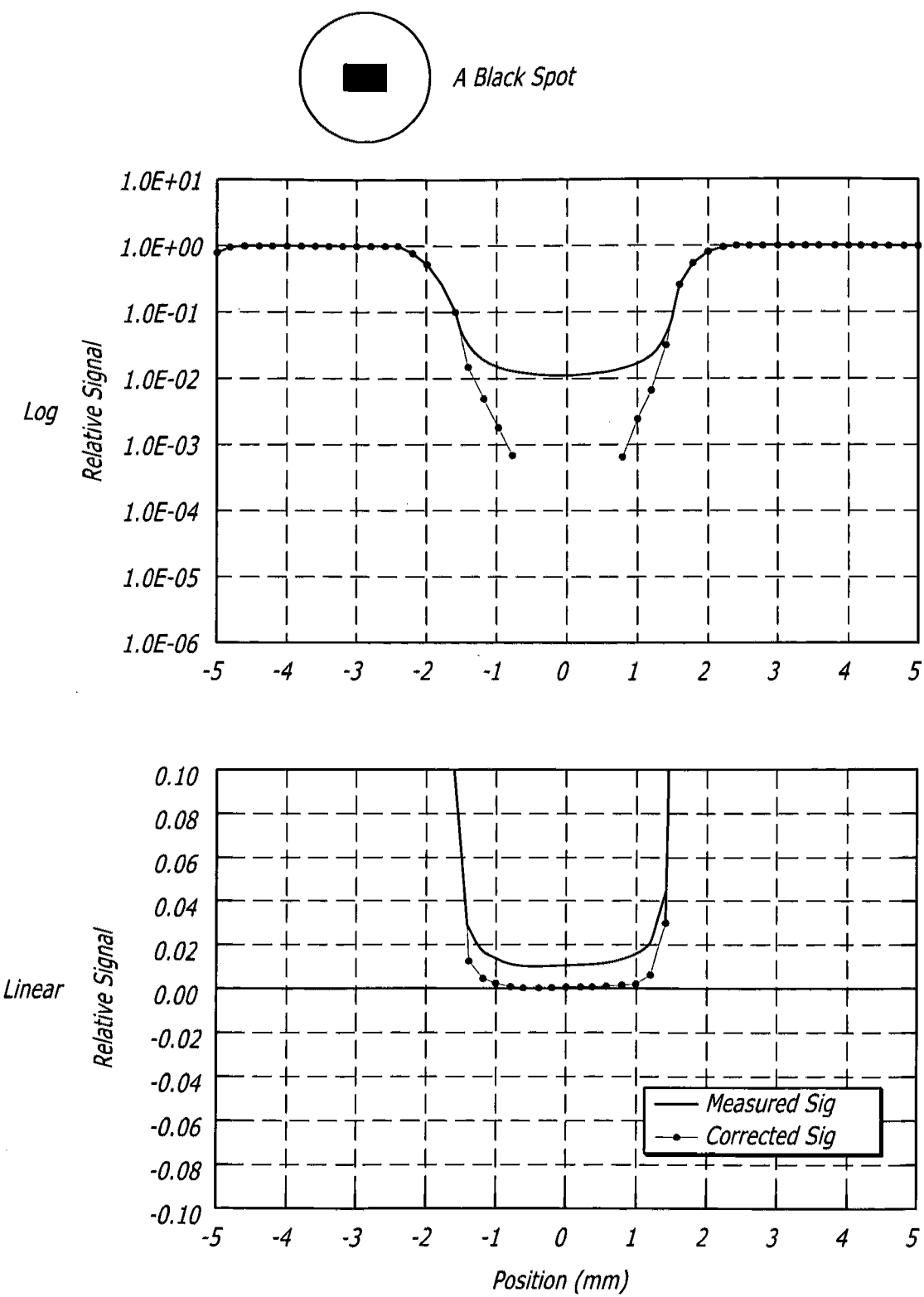
FIG. 7 illustrates measurement results from a stray-light corrected CCD imaging photometer in accordance with one embodiment of the present disclosure.

After an instrument has been corrected using the simple matrix method technique described herein, the correction results may be validated. Referring now to FIG. 7, illustrated are measurement results from a stray-light corrected CCD photometer in accordance with one embodiment of the present disclosure.

The graphs illustrated in FIG. 7 show measurement results for a stray-light corrected CCD photometer which was used to measure the luminance of a black spot. The upper graph shows the logarithmic measurement results, and the lower graph shows linear measurement results. In the correction results for this black spot, the correction matrix was 4096 elements by 4096 elements in size.

The black spot, which could be a piece of black aluminum foil or other opaque black disk, was placed on the port of an integrating sphere light source. The size of the sphere port was adjusted to be smaller than the FOV of the imaging photometer, so that stray-light signals arising from sources outside the FOV were theoretically zero. As shown, the stray-light signals were corrected by more than one order of magnitude.

High resolution imaging instruments may present particular problems in use with the simple matrix method. It should be noted that whether or not an instrument is classified as high resolution may depend on the type of instrument. For example, the term "high resolution" when used in connection with a microscope may have a different meaning than when the term is used for a telescope. What is apparent is that instruments having large numbers of pixels may present particular concerns when the simple matrix method is applied because large correction matrices may result. Accordingly, a binning technique or other image compression techniques may be used to deal with large correction matrices. The aim of the binning technique is to reduce the resolution by allowing multiple adjacent pixels to be combined into one pixel for the purpose of stray-light correction only.

Figure 8:
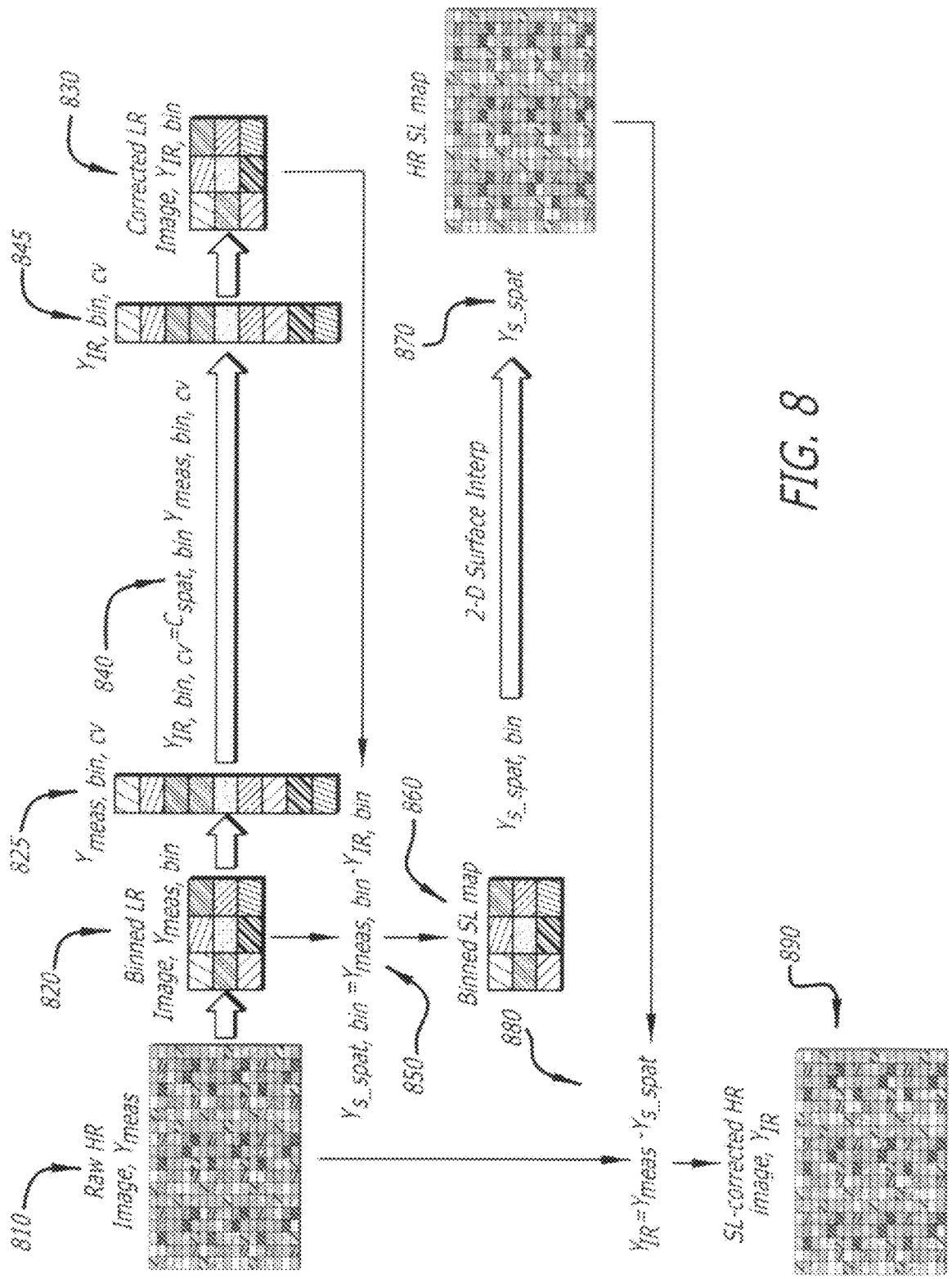
FIG. 8 illustrates a flow diagram that shows how binning may be used with the simple matrix method technique in accordance with one embodiment of the present disclosure.

Referring now to FIG. 8, illustrated is a flow diagram that shows how binning may be used with the simple matrix method technique in accordance with one embodiment of the present disclosure.

Some high resolution imaging instruments may have as many as ten million (10,000,000) pixels or more of resolution capability. For a high resolution imaging instrument having a large number of imaging elements, the raw measured high resolution (HR) image, $Y_{meas}$, may be binned to a low resolution (LR) image, $Y_{meas,bin}$ to reduce the size of the correction matrix, without reducing the resolution of the image.

In FIG. 8, the high resolution image, which may have an 18×18 raw signal, is received at step 810. This 18×18 raw signal may be binned or compressed to a 3×3 raw signal at step 820 to obtain the binned corrected signal at step 830. Before obtaining the binned corrected signal at step 830, the binned image may be transformed first to a one-dimensional column vector as shown at step 825 and then corrected for stray light to obtain the stray-light corrected image via the following equation as shown at step 840:

$$Y_{IR,bin,cv} = C_{spat,bin}Y_{meas,bin,cv} \quad \text{(Equation 8)}$$

The one-dimensional column vector $Y_{IR, bin, cv}$ shown at step 845 may be transformed then to a two-dimensional matrix $Y_{IR, bin}$ shown at step 830. The two-dimensional stray-light signal for the binned or compressed image may be expressed as $Y_{s\_spat}$, bin, may be determined using the following equation as shown at step 850:

$$Y_{s\_spat,bin} = Y_{meas,bin} - Y_{IR,bin} \quad \text{(Equation 9)}$$

The two-dimensional matrix $Y_{s\_spat}$, bin may be interpolated/extrapolated to a two-dimensional high resolution stray-light matrix $Y_{s\_spat}$ as shown at step 870. The stray-light corrected high resolution image is obtained by the following equation as shown at step 880:

$$Y_{IR} = Y_{meas} - Y_{spat} \quad \text{(Equation 10)}$$

The stray-light corrected image is then obtained as shown at step 890.

It should be noted that the SDF matrix (or SDF functions) may also be directly used to correct stray-light errors using an iterative approach such as shown in Equation 11. Depending on the imaging instrument, the far-field elements of a SDF may be small enough that may be replaced with zeros, which can reduce actual size of the SDF and therefore increase computing speed. An iterative approach is in general slower and more cumbersome than the approach using the stray-light correction matrix as described above.

$$Y_{IR}^{(k+1)} = Y_{meas} - DY_{IR}^{(k)}, k=0, 1, 2, \ldots$$

$$Y_{IR}^{(0)} = Y_{meas}. \quad \text{(Equation 11)}$$

As described herein, a simple practical method is used to correct stray-light errors in optical systems or imaging instruments. These systems include imaging photometers/radiometers, hyperspectral imaging instruments and the like. This simple correction may be easily implemented in the software of an imaging instrument so that fast corrections can be made. By applying such a correction, stray-light errors can be reduced by more than one order of magnitude. In addition to stray-light correction, the simple matrix method may be used to correct other types of unwanted responses, e.g., the interreflection between the detector array and the detector window, for an imaging instrument.

Figure 9:
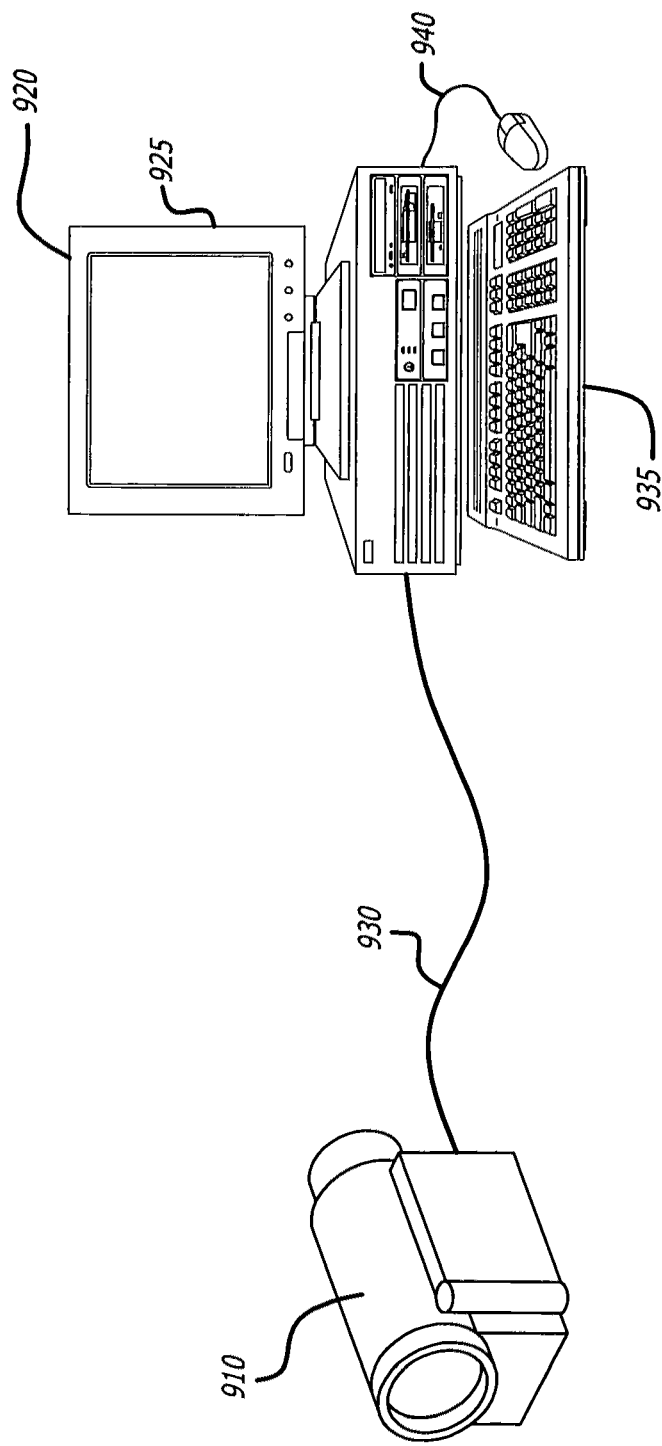
FIG. 9 illustrates is a system used to implement the simple matrix method of the present disclosure.

The simple matrix method may be implemented using a conventional personal computer. Referring now to FIG. 9, illustrated is a diagram of a system used to implement the simple matrix method of the present disclosure. The simple matrix method may be implemented in software that is run on one or more user workstations, e.g., workstation 920. These workstations may be used to configure modules and/or to receive and transmit information to the simple matrix method software. Here, a USB connection 930 is used to receive and transmit information to the simple matrix method software. For example, imaging instrument 910 can transmit measured raw signals via USB connection 930 or any type of communication interface.

User workstation 920 may be a conventional personal computer, and may be provided, for example, as an IBM®-compatible computer, APPLE®, MACINTOSH® personal computer, UNIX®-based workstation, or any other equivalent computer system, whether laptop, desktop or otherwise.

Under some circumstances, these workstations may be personal digital assistants (PDA's) or any other such device. The computer system used may also include e.g., a WINDOWS® hand-held device such as a POCKET PC® hand-held device.

Each workstation 920 may include a central processing unit, a display 925, a mouse 940, and a keyboard 935 for receiving user input into the system. Input devices, e.g., a mouse and the keyboard may be coupled to the user's workstation so that the user's computer may receive information that is input by him/her, and/or so that imaging information can be routed through a network to a central server.

The exemplary workstations described herein are for descriptive purposes only. Although the description may refer to terms commonly used in describing particular computer systems, the description and concepts equally apply to other processing systems, including systems having architectures dissimilar to those described.

The read only memory (ROM) for each workstation may operate to effect permanent storage of information. Random access memory (RAM) for each workstation may operate to effect temporary storage of information. Each of the aforementioned components may be coupled to a bus. Operation of workstations used to implement the simple matrix method may be generally controlled and coordinated by operating system software. The operating system that runs on each workstation may be, but is not limited to, MICROSOFT® WINDOWS VISTA®, MICROSOFT® WINDOWS XP®, or a version of MAC OS® or UNIX® operating system or the like.

Alternatively, the principles of the present invention can be applied to a computer system using a version of DOS (disk operating system), or other operating system programs. An operating system resident in system memory and executed by the CPUs of the workstations may coordinate the operation of the other elements of workstations.

Data and software, including the simple matrix method software, may be provided to and extracted from each workstation or a central server via removable storage media such as, without limitation, a CD-ROM or DVD.

Each workstation may include a communications adapter, e.g., connection 930, which allows the workstation to be interconnected to a local area network (LAN), a wide area network (WAN) or a public network. Thus, imaging data and related computer program software may be transferred to and from each workstation via the adapter and network.

The communications adapter 930 may be a firewire or a USB port such as those that may be used with many of today's imaging instruments suitable for scientific applications.

Either all or portions of the stray-light correction software used to achieve the purposes of the present disclosure can be resident on each workstation. Alternatively, either all or portions of the stray-light correction software may be resident on a central server.

In some cases, the simple matrix method may even be implemented in software resident in the imaging instrument itself.

While the specification describes particular embodiments of the present invention, those of ordinary skill can devise variations of the present invention without departing from the inventive concept.

We claim:

1. A simple matrix method for stray-light correction in an imaging instrument, comprising the steps of:
   determining a set of point spread functions for the imaging instrument;
   deriving a stray-light distribution function for each of said point spread functions;
   transforming each said stray-light distribution function into a one-dimensional column vector;
   based on the derived stray-light distribution functions and one-dimensional column vector, obtaining a stray-light distribution matrix;
   deriving a stray-light correction matrix, including inverting the stray-light distribution matrix and an identity matrix; and
   based on the derived stray-light correction matrix, correcting stray light errors in an image from the imaging instrument.

2. The method of claim 1, wherein the step of determining a set of point spread functions includes the step of:
   receiving, from the imaging instrument, measured raw signals of a light source.

3. The method of claim 2, wherein the measured raw signals represent radiance or luminance of a light source.

4. The method of claim 2, wherein the light source is a point source.

5. The method of claim 2, further comprising:
   binning or compressing the measured raw signals to reduce the number of measured raw signals.

6. The method of claim 2, further comprising:
   binning or compressing the measured raw signals, thus reducing the number of measured raw signals without reducing the resolution of an image that is received with the measured raw signals.

7. The method of claim 1, wherein the obtaining step includes the steps of:
   interpolating or extrapolating among the derived stray-light distribution functions to obtain additional stray-light distribution functions.

8. The method of claim 1, wherein the obtaining step includes the step of:
   transforming each stray-light distribution function to a one-dimensional column vector.

9. The method of claim 1, further comprising the step of:
   correcting stray-light errors based on the stray-light correction matrix.

10. A computer program product comprising a non-transitory computer useable medium having computer readable code embodied therein for a simple matrix method for stray-light correction, the computer program product comprising:
    point spread function code for causing the computer to determine a set of point spread functions for the imaging instrument;

stray-light distribution function code for causing the computer to derive a stray-light distribution function for each of said point spread functions;

transformation code for transforming each said stray-light distribution function into a one-dimensional column vector;

stray-light distribution matrix code for causing the computer to obtain a stray-light distribution matrix based on the derived stray-light distribution functions and one-dimensional column vector;

stray-light correction matrix code for causing the computer to derive a stray-light correction matrix, including code for causing the computer to invert the stray-light distribution matrix and an identity matrix; and image correction code for causing the computer to correct stray light errors in an image from the imaging instrument, the correction being based on the derived stray-light correction matrix.

11. The computer program product of claim 10, wherein the point spread function code includes receiving code for causing the computer to receive, from the imaging instrument, measured raw signals for radiance or luminance of a point source.

12. The computer program product of claim 10, wherein the stray-light distribution matrix code includes interpolation/extrapolation code for causing the computer to interpolate or extrapolate among the derived stray-light distribution functions to obtain additional stray-light distribution functions.

13. The computer program product of claim 10, wherein the stray-light distribution matrix code includes transformation code for causing the computer to transform each of the obtained stray-light distribution functions to a one-dimensional column vector.

14. The computer program product of claim 10, further comprising:
binning/compressing code for causing the computer to bin or compress the measured raw signals to a lesser number of signals.

15. The computer program product of claim 10, further comprising:
stray-light correction code for causing the computer to correct stray-light errors based on the stray-light correction matrix.

16. The computer program product of claim 10, further comprising:
binning/compressing code for causing the computer to bin or compress the measured raw signals to a lesser number of signals, without reducing the resolution of an image that is received with the measured raw signals.

17. A simple matrix method for stray-light correction in an imaging instrument, comprising the steps of:
receiving, from the imaging instrument, measured raw signals of a light source;
binning or compressing the measured raw signals to reduce the number of measured raw signals;
based on the binned/compressed raw signals, determining a set of point spread functions for the imaging instrument;
deriving a stray-light distribution function for each of said point spread functions;
transforming each said stray-light distribution function into a one-dimensional column vector;
based on the derived stray-light distribution functions and one-dimensional column vector, obtaining a stray-light distribution matrix;
deriving a stray-light correction matrix, including inverting the stray-light distribution matrix and an identity matrix; and
based on the derived stray-light correction matrix, correcting stray light errors in an image from the imaging instrument.

18. The method of claim 17, wherein the measured raw signals include signals that represent radiance or luminance of a light source.

19. The method of claim 18, wherein the light source is a point source.

20. The method of claim 17, wherein the obtaining step includes the steps of:
interpolating or extrapolating among the derived stray-light distribution functions to obtain additional stray-light distribution functions.

21. The method of claim 17, wherein the obtaining step includes the step of:
transforming each stray-light distribution function to a one-dimensional column vector.

22. A simple matrix method for stray-light correction in an imaging instrument, comprising the steps of:
receiving, from the imaging instrument, measured raw signals of a light source;
based on the raw signals, determining a set of point spread functions for the imaging instrument;
deriving a stray-light distribution function for each of said point spread functions;
transforming each said stray-light distribution function into a one-dimensional column vector;
based on the derived stray-light distribution functions and one-dimensional column vector, obtaining a stray-light distribution matrix;
deriving a stray-light correction matrix, including inverting the stray-light distribution matrix and an identity matrix, wherein the stray-light correction matrix includes a number of elements;
applying a binning or compression technique to reduce the number of elements in the correction matrix; and
based on the binned stray-light correction matrix, correcting stray light errors in an image from the imaging instrument.

23. The method of claim 22, further comprising:
correcting stray-light errors based on the stray-light correction matrix.

24. The method of claim 22, wherein the binning or compression technique is further configured to reduce the number of elements in the correction matrix without reducing the resolution of an image that is received with the measured raw signals.

* * * * *